United States Patent Office 3,004,629
Patented Oct. 17, 1961

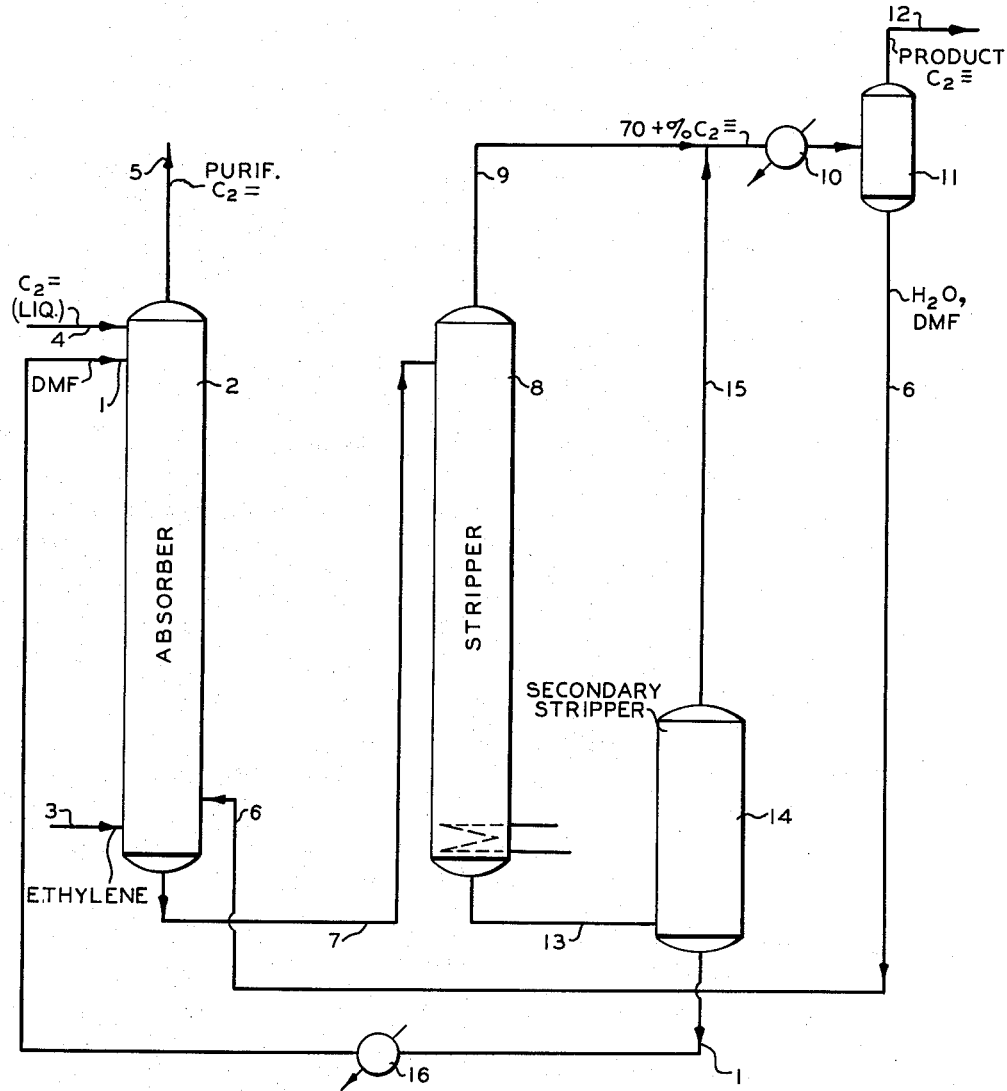

3,004,629
METHOD FOR REMOVING ACETYLENE FROM ETHYLENE
John E. Cottle, Bartlesville, Okla., assignor to Phillips Petroleum Company, a corporation of Delaware
Filed Sept. 25, 1959, Ser. No. 842,418
4 Claims. (Cl. 183—115)

This invention relates to an improved method for the removal of acetylene from ethylene. In one of its aspects, the invention relates to a method for the recovery of acetylene from a mixture of gases containing ethylene and acetylene, employing dimethylformamide as an absorbing agent, using water to decrease the solubility of ethylene in the dimethylformamide yet recovering a dry ethylene overhead product from the absorber. In another of its aspects, the invention relates to the injection of water into an absorber in which dimethylformamide is employed to absorb acetylene from a mixture of gases containing it and ethylene to obtain intercooling in the absorption zone.

The separation of acetylene from a mixture of gases containing it and ethylene is well known. It is known to use dimethylformamide as a solvent for the separation.

It has now occurred to me that the introduction of water to an acetylene absorption column either separately or together with at least a portion of the dimethylformamide being introduced to the column will favorably affect the separation of the minor amount of acetylene which is contained in the ethylene gas being treated. The use of water will alter the characteristics of the solvent to somewhat reduce the solubility of both the ethylene and the acetylene at the point of introduction of the water resulting, however, in an increased selectivity for acetylene as against ethylene, thus increasing the amount of substantially pure, dry ethylene which can be recovered from the absorption system. The point of introduction of the water to the absorption column or zone is so chosen that water vapor tending to rise through the column is absorbed by the downwardly flowing solvent, thus resulting in a dry overhead gas.

It is an object of this invention to provide an improved separation of acetylene from ethylene. It is a further object of this invention to provide an improvement in the separation of acetylene from ethylene employing dimethylformamide as a solvent. It is a still further object of the invention to provide an improved method for the separation of acetylene from ethylene employing dimethylformamide as a solvent to yield increased recovery of acetylene free, substantially dry ethylene. Another object of the invention is the production of relatively high purity $C_2H_2$.

Other aspects, objects, and the several advantages of the invention are apparent from a study of the disclosure, the drawing, and the appended claims.

According to the present invention, there is introduced into the bottom portion of an acetylene from ethylene absorber, employing dimethylformamide as a downwardly flowing acetylene removal solvent, water in a quantity sufficient to decrease the ethylene solubility in the dimethylformamide solvent in the bottom portion of the absorber but in a quantity insufficient to prevent absorption by the downwardly flowing dimethylformamide of any water vapor tending to rise in the absorber.

The quantity of water introduced will, of course, be insufficient to significantly affect the overall absorption of $C_2H_2$. Usually 1–25 mol percent water will be introduced into the column based on the total solvent feed to the column.

Referring now to the drawing, dimethylformamide introduced at 1 into tower 2 is contacted therein with rising ethylene containing gas introduced into tower 2 by way of pipe 3. The dimethylformamide is essentially anhydrous. The tower is washed down at its upper portion by liquid ethylene introduced by pipe 4. Purified ethylene is taken off overhead by pipe 5. According to the invention the yield of ethylene coming off at pipe 5 is increased by introducing water to the lower portion of column 2 by pipe 6. The water is now preferred to be introduced as a dilute dimethylformamide aqueous solution. Introduction of water as a dilute aqueous dimethylformamide solution prevents its freezing upon entering the low temperature absorber. Solvent enriched with acetylene is withdrawn by pipe 7 and passed to stripper 8 from the top of which a gaseous stream consisting essentially of acetylene is removed by way of pipe 9, cooler 10, and knockout drum 11 to acetylene storage by way of pipe 12. If desired, stream 7 may be subjected to one or more flashing steps, not shown, prior to its introduction into stripper 8. $C_2H_4$ thus flashed is compressed and returned to the absorber. This will further reduce the amount of $C_2H_4$ lost via line 12. A dilute water solution of dimethylformamide is removed from knockout drum 11 and passed by way of pipe 6 to tower 2 for use as described herein. Bottoms from stripper 8 are passed by way of pipe 13 to additional solvent recovery vessel 14 from the bottom of which dimethylformamide is passed by way of pipe 1 and cooler 16 to tower 2. Some additional acetylene, water vapor, and dimethylformamide vapor pass by way of pipe 15 to pipe 9 for recovery together with the stream already in pipe 9 coming from stripper 8.

Introduction of the water at an intermediate point, or points, according to the invention, will result in evolution of ethylene from the liquid phase, causing a reduction in temperature. Thus, according to the invention, intercooling is obtained in the intermediate portion of the tower.

The dry dimethylformamide introduced by way of pipe 1 can be presaturated with liquid ethylene as set forth and described in copending application Serial Number 624,465, filed November 26, 1956 by Robert A. Koble.

It now appears, based on data which have been obtained, that acetylene concentration in the dimethylformamide stripper overhead $C_2$ hydrocarbon stream can be increased to better than 90 percent according to the present invention. This will, of course, considerably reduce ethylene loss in the acetylene flowing from this stripper and this ethylene will be recovered from the acetylene absorber.

Further, water vapor at the top of the stripper, resulting from the introduction of water to the absorber, tends to eliminate completely the explosion hazard ahead of the now conventional condenser. Since the dimethylformamide will tend to stay with the water, which is present according to the invention, a refrigerated condenser to knock out the dimethylformamide, conventionally used, can be considerably reduced in capacity or completely eliminated, depending upon the extent of recovery desired.

Since intercooling is obtained due to the evolution of ethylene in the lower portion of the absorber, a reduction in the dimethylformamide solvent circulation can desirably be practiced in some instances.

It is important to note, in the operation of the method of the invention, the concept that the water vapor which tends to rise in the absorber column is absorbed by the cold, dry dimethylformamide solvent passing downwardly through the column thus resulting in a dry ethylene off-gas stream.

The conditions of operation in the absorber in the embodiment described are approximately as follows. The dimethylformamide solvent and liquid ethylene contact the rising gases at a temperature of 0° F. and at a pressure of approximately 300 pounds per square inch absolute pressure. The feed stream of gases from which acetylene is to be removed will have the following composition.

| | Mols per day |
|---|---|
| Acetylene | 150 |
| Ethylene | 10,000 |
| Ethane | 90 |
| Total | 10,240 |

The bottom tray of the absorber will be at a temperature of approximately 20° F. Anhydrous dimethylformamide is introduced to the tower at an approximate rate of 3,310 mols per day. A portion of the purified ethylene taken overhead from the absorber is liquefied and returned to the top of the column at a rate of approximately 1,950 mols per day. This quantity of ethylene is just sufficient to saturate the liquid dimethylformamide introduced to the absorber.

The amount of water introduced, as stated, can be varied to be sufficient to accomplish some of the benefits of the invention but insufficient to prevent obtaining a dry, purified ethylene overhead gas from the absorber. In the embodiment described, there will be introduced 660 mols per day of water, containing approximately 10 mols per day of dimethylformamide.

One skilled in the art in possession of this disclosure, having studied the same, will be able to readily design and construct and successfully operate an acetylene from ethylene absorption system according to the invention. With respect to further characteristics and details which may be helpful, the information of Serial Number 624,465, above mentioned, is incorporated herewith by reference.

Solubility data for acetylene in the aqueous dimethylformamide in the bottom portion of the column as contained in a feed stream treated by the system are as follows:

$C_2H_2$ solubility in 80–20 volume percent DMF—$H_2O$ at 20° F.

| $C_2H_2$ mol fraction: | Absolute pressure, mm. Hg |
|---|---|
| 0.0011 | 57.0 |
| 0.0019 | 90.5 |
| 0.0019 | 93.0 |
| 0.0023 | 109.0 |
| 0.0029 | 125.0 |

$C_2H_4$ solubility—same conditions.

| $C_2H_4$ mol fraction: | Pressure p.s.i.a. |
|---|---|
| 0.0035 | 40.6 |
| 0.0042 | 40.6 |
| 0.0049 | 50.7 |
| 0.0052 | 51.0 |
| 0.0060 | 60.2 |

In the now preferred operation of the invention, the weight ratio of water to dimethylformamide solvent present in the tower at the point of introduction of the water will be 16 to 1.

The following are quantities of specific flows in a unit operated according to the invention and are given by way of an example in which units are given in mols per day.

Stream 3:
$C_2\equiv$ 150
$C_2=$ 10,000
$C_2$ 90

Stream 5:
$C_2$ 90
$C_2=$ 11,895
$C_2\equiv$ Trace
DMF Nil

Stream 4:
1,950

Stream 1:
3,310

Stream 7:
$C_2\equiv$ 150
$C_2=$ 55
DMF 3,320
$H_2O$ 660

Stream 6:
DMF 10
$H_2O$ 660

Stream 12:
$C_2\equiv$ 150
$C_2=$ 55

With respect to the selectivity of the invention, i.e., the solubility of acetylene and ethylene, there is information showing that in wet dimethylformamide the activity coefficient for $C_2H_4$ is about 28, that is ten times higher than in dry dimethylformamide. In view of the higher activity coefficient there would be less ethylene in the bottoms when operating the present invention. Thus, whereas in stream 7 the ratio of $C_2H_2:C_2H_4$ is 2.7:1, in the same system with dry dimethylformamide it would be but 0.2:1.

In an absorption column containing, for example, 40 trays and having a diameter of 3½ feet and a gas throughput of 10,240 mols per day, the aqueous DMF may be introduced into the column at any point below the 8th tray from the top of the absorber.

Reasonable variation and modification are possible within the scope of the foregoing disclosure, the drawing, and the appended claims to the invention the essence of which is that in a dimethylformamide solvent removal of acetylene and ethylene, water is employed in the lower portion of the absorber thus increasing the yield of dry, purified ethylene and obtaining other advantages as evident from a study of this disclosure.

I claim:

1. A method for the purification of an ethylene stream also containing acetylene which comprises contacting said stream with a stream of dry dimethylformamide, flowing the streams countercurrently to each other, introducing water to the thus contacted streams after substantial contact of them has been obtained so as to release ethylene from the solvent phase, thus removing from the contacting operation a solvent enriched with acetylene and an essentially dry ethylene gas substantially free from acetylene, the quantity of water introduced being sufficient to reduce the solubility of ethylene in the dimethylformamide solvent but insufficient to cause water vapor to be present in the purified ethylene stream.

2. A method for the purification of ethylene which comprises introducing an ethylene and acetylene containing gas to the bottom of an absorber zone and passing the same upwardly countercurrent to a downwardly moving stream of essentially dry dimethylformamide, introducing water to the absorber zone at a point intermediate the introduction of the ethylene containing stream and the dimethylformamide entry to the absorber zone, the amount of the water being sufficient to reduce the solubility of ethylene in the dimethylformamide but insufficient to permit water vapor to be liberated in the absorber zone in a quantity in excess of that which can be captured by the downwardly flowing dimethylformamide, recovering purified ethylene from the top of the absorber zone and dimethylformamide solvent enriched with acetylene and containing water from the bottom of said absorber zone.

3. A method according to claim 2 wherein an aqueous solution of dimethylformamide is introduced into the bottom portion of said absorber zone.

4. A method according to claim 3 wherein the weight ratio of water to dimethylformamide in said aqueous solution is in the range of from 1:1 to 24:1.

References Cited in the file of this patent

UNITED STATES PATENTS

| | | |
|---|---|---|
| 2,371,908 | Morris et al. | Mar. 20, 1945 |
| 2,809,710 | Hachmuth | Oct. 15, 1957 |
| 2,871,979 | Scofield | Feb. 3, 1959 |
| 2,907,409 | Koble | Oct. 6, 1959 |